United States Patent
Lin et al.

(10) Patent No.: US 12,063,226 B1
(45) Date of Patent: *Aug. 13, 2024

(54) GRAPH-BASED MULTI-STAGED ATTACK DETECTION IN THE CONTEXT OF AN ATTACK FRAMEWORK

(71) Applicant: Exabeam, Inc., Foster City, CA (US)

(72) Inventors: Derek Lin, San Mateo, CA (US); Domingo Mihovilovic, Menlo Park, CA (US); Sylvain Gil, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 417 days.

This patent is subject to a terminal disclaimer.

(21) Appl. No.: 17/484,348

(22) Filed: Sep. 24, 2021

Related U.S. Application Data

(60) Provisional application No. 63/084,899, filed on Sep. 29, 2020.

(51) Int. Cl.
*H04L 9/40* (2022.01)
*G06F 16/901* (2019.01)
*H04L 41/0631* (2022.01)

(52) U.S. Cl.
CPC ...... *H04L 63/1416* (2013.01); *G06F 16/9024* (2019.01); *H04L 41/064* (2013.01); *H04L 41/065* (2013.01)

(58) Field of Classification Search
CPC . H04L 63/1416; H04L 41/064; H04L 41/065; G06F 16/9024
See application file for complete search history.

(56) References Cited

U.S. PATENT DOCUMENTS

| | | |
|---|---|---|
| 5,941,947 A | 8/1999 | Brown et al. |
| 6,223,985 B1 | 5/2001 | DeLude |
| 6,594,481 B1 | 7/2003 | Johnson et al. |
| 7,181,768 B1 | 2/2007 | Ghosh et al. |
| 7,624,277 B1 | 11/2009 | Simard et al. |
| 7,668,776 B1 | 2/2010 | Ahles |
| 8,326,788 B2 | 12/2012 | Allen et al. |

(Continued)

OTHER PUBLICATIONS

Bahnsen, Alejandro Correa "Classifying Phishing URLs Using Recurrent Neural Networks", IEEE 2017.

(Continued)

*Primary Examiner* — Wasika Nipa
*Assistant Examiner* — Andrew Suh
(74) *Attorney, Agent, or Firm* — Lessani Law Group, PC

(57) ABSTRACT

The present disclosure relates to a system, method, and computer program for graph-based multi-stage attack detection in which alerts are displayed in the context of tactics in an attack framework, such as the MITRE ATT&CK framework. The method enables the detection of cybersecurity threats that span multiple users and sessions and provides for the display of threat information in the context of a framework of attack tactics. Alerts spanning an analysis window are grouped into tactic blocks. Each tactic block is associated with an attack tactic and a time window. A graph is created of the tactic blocks, and threat scenarios are identified from independent clusters of directionally connected tactic blocks in the graph. The threat information is presented in the context of a sequence of attack tactics in the attack framework.

16 Claims, 4 Drawing Sheets

(56) References Cited

U.S. PATENT DOCUMENTS

| | | |
|---|---|---|
| 8,443,443 B2 | 5/2013 | Nordstrom et al. |
| 8,479,302 B1 | 7/2013 | Lin |
| 8,484,230 B2 | 7/2013 | Harnett et al. |
| 8,539,088 B2 | 9/2013 | Zheng |
| 8,583,781 B2 | 11/2013 | Raleigh |
| 8,606,913 B2 | 12/2013 | Lin |
| 8,676,273 B1 | 3/2014 | Fujisake |
| 8,850,570 B1 | 9/2014 | Ramzan |
| 8,881,289 B2 | 11/2014 | Basavapatna et al. |
| 9,055,093 B2 | 6/2015 | Borders |
| 9,081,958 B2 | 7/2015 | Ramzan et al. |
| 9,129,110 B1 | 9/2015 | Mason et al. |
| 9,185,095 B1 | 11/2015 | Moritz et al. |
| 9,189,623 B1 | 11/2015 | Lin et al. |
| 9,202,052 B1 | 12/2015 | Fang et al. |
| 9,680,938 B1 | 6/2017 | Gil et al. |
| 9,690,938 B1 | 6/2017 | Saxe et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,798,883 B1 | 10/2017 | Gil et al. |
| 9,843,596 B1 | 12/2017 | Averbuch et al. |
| 9,898,604 B2 | 2/2018 | Fang et al. |
| 10,063,582 B1 | 8/2018 | Feng et al. |
| 10,095,871 B2 | 10/2018 | Gil et al. |
| 10,178,108 B1 | 1/2019 | Lin et al. |
| 10,354,015 B2 | 7/2019 | Kalchbrenner et al. |
| 10,360,387 B2 | 7/2019 | Jou et al. |
| 10,397,272 B1 | 8/2019 | Bruss et al. |
| 10,419,470 B1 | 9/2019 | Segev et al. |
| 10,445,311 B1 | 10/2019 | Saurabh et al. |
| 10,467,631 B2 | 11/2019 | Dhurandhar et al. |
| 10,474,828 B2 | 11/2019 | Gil et al. |
| 10,496,815 B1 | 12/2019 | Steiman et al. |
| 10,621,343 B1 | 4/2020 | Maciejak et al. |
| 10,645,109 B1 | 5/2020 | Lin et al. |
| 10,685,293 B1 | 6/2020 | Heimann et al. |
| 10,803,183 B2 | 10/2020 | Gil et al. |
| 10,819,724 B2 | 10/2020 | Amiri et al. |
| 10,841,338 B1 | 11/2020 | Lin et al. |
| 10,887,325 B1 | 1/2021 | Lin et al. |
| 10,944,777 B2 | 3/2021 | Lin et al. |
| 11,017,173 B1 | 5/2021 | Lu et al. |
| 11,080,483 B1 | 8/2021 | Islam et al. |
| 11,080,591 B2 | 8/2021 | van den Oord et al. |
| 11,140,167 B1 | 10/2021 | Lin et al. |
| 11,151,471 B2 | 10/2021 | Niininen et al. |
| 11,178,168 B1 | 11/2021 | Lin et al. |
| 11,245,716 B2 | 2/2022 | Roelofs et al. |
| 11,423,143 B1 | 8/2022 | Lin et al. |
| 11,431,741 B1 | 8/2022 | Lin et al. |
| 11,625,366 B1 | 4/2023 | Steiman et al. |
| 11,956,253 B1 | 4/2024 | Lin et al. |
| 2002/0107926 A1 | 8/2002 | Lee |
| 2003/0065926 A1 | 4/2003 | Schultz et al. |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0028467 A1 | 1/2008 | Kommareddy et al. |
| 2008/0040802 A1 | 2/2008 | Pierson et al. |
| 2008/0170690 A1 | 7/2008 | Tysowski |
| 2008/0262990 A1 | 10/2008 | Kapoor et al. |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0292954 A1 | 11/2009 | Jiang et al. |
| 2009/0293121 A1 | 11/2009 | Bigus et al. |
| 2010/0125911 A1 | 5/2010 | Bhaskaran |
| 2010/0191763 A1 | 7/2010 | Wu |
| 2010/0269175 A1 | 10/2010 | Stolfo et al. |
| 2010/0284282 A1 | 11/2010 | Golic |
| 2011/0167495 A1 | 7/2011 | Antonakakis et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0268260 A1 | 10/2013 | Lundberg et al. |
| 2013/0305357 A1 | 11/2013 | Ayyagari et al. |
| 2013/0340028 A1 | 12/2013 | Rajagopal et al. |
| 2014/0007238 A1 | 1/2014 | Magee |
| 2014/0090058 A1 | 3/2014 | Ward et al. |
| 2014/0101759 A1 | 4/2014 | Antonakakis et al. |
| 2014/0315519 A1 | 10/2014 | Nielsen |
| 2015/0026027 A1 | 1/2015 | Priess et al. |
| 2015/0039543 A1 | 2/2015 | Athmanathan et al. |
| 2015/0046969 A1 | 2/2015 | Abuelsaad et al. |
| 2015/0100558 A1 | 4/2015 | Fan |
| 2015/0121503 A1 | 4/2015 | Xiong |
| 2015/0205944 A1 | 7/2015 | Turgeman |
| 2015/0215325 A1 | 7/2015 | Ogawa |
| 2015/0339477 A1 | 11/2015 | Abrams et al. |
| 2015/0341379 A1 | 11/2015 | Lefebvre et al. |
| 2015/0363691 A1 | 12/2015 | Gocek et al. |
| 2016/0005044 A1 | 1/2016 | Moss et al. |
| 2016/0021117 A1 | 1/2016 | Harmon et al. |
| 2016/0063397 A1 | 3/2016 | Ylipaavalniemi et al. |
| 2016/0292592 A1 | 10/2016 | Patthak et al. |
| 2016/0306965 A1 | 10/2016 | Iyer et al. |
| 2016/0364427 A1 | 12/2016 | Wedgeworth, III |
| 2017/0019506 A1 | 1/2017 | Lee et al. |
| 2017/0024135 A1 | 1/2017 | Christodorescu et al. |
| 2017/0127016 A1 | 5/2017 | Yu et al. |
| 2017/0155652 A1 | 6/2017 | Most et al. |
| 2017/0161451 A1 | 6/2017 | Weinstein et al. |
| 2017/0178026 A1 | 6/2017 | Thomas et al. |
| 2017/0213025 A1 | 7/2017 | Srivastav et al. |
| 2017/0236081 A1 | 8/2017 | Grady Smith et al. |
| 2017/0264679 A1 | 9/2017 | Chen et al. |
| 2017/0318034 A1 | 11/2017 | Holland et al. |
| 2017/0323636 A1 | 11/2017 | Xiao et al. |
| 2018/0004961 A1 | 1/2018 | Gil et al. |
| 2018/0048530 A1 | 2/2018 | Nikitaki et al. |
| 2018/0063168 A1 | 3/2018 | Sofka |
| 2018/0069893 A1 | 3/2018 | Amit et al. |
| 2018/0075343 A1 | 3/2018 | van den Oord et al. |
| 2018/0089304 A1 | 3/2018 | Vizer et al. |
| 2018/0097822 A1 | 4/2018 | Huang et al. |
| 2018/0144139 A1 | 5/2018 | Cheng et al. |
| 2018/0157963 A1 | 6/2018 | Salti et al. |
| 2018/0165554 A1 | 6/2018 | Zhang et al. |
| 2018/0181883 A1 | 6/2018 | Ikeda |
| 2018/0190280 A1 | 7/2018 | Cui et al. |
| 2018/0234443 A1 | 8/2018 | Wolkov et al. |
| 2018/0248895 A1 | 8/2018 | Watson et al. |
| 2018/0285340 A1 | 10/2018 | Murphy et al. |
| 2018/0288063 A1 | 10/2018 | Koottayi et al. |
| 2018/0288086 A1 | 10/2018 | Amiri et al. |
| 2018/0307994 A1 | 10/2018 | Cheng et al. |
| 2018/0316701 A1 | 11/2018 | Holzhauer et al. |
| 2018/0322368 A1 | 11/2018 | Zhang et al. |
| 2019/0014149 A1 | 1/2019 | Cleveland et al. |
| 2019/0028496 A1 | 1/2019 | Fenoglio et al. |
| 2019/0034641 A1 | 1/2019 | Gil et al. |
| 2019/0066185 A1 | 2/2019 | More et al. |
| 2019/0080225 A1 | 3/2019 | Agarwal |
| 2019/0089721 A1 | 3/2019 | Pereira et al. |
| 2019/0103091 A1 | 4/2019 | Chen |
| 2019/0114419 A1 | 4/2019 | Chistyakov et al. |
| 2019/0124045 A1 | 4/2019 | Zong et al. |
| 2019/0132629 A1 | 5/2019 | Kendrick |
| 2019/0149565 A1 | 5/2019 | Hagi et al. |
| 2019/0171655 A1 | 6/2019 | Psota et al. |
| 2019/0182280 A1 | 6/2019 | La Marca et al. |
| 2019/0205750 A1 | 7/2019 | Zheng et al. |
| 2019/0207969 A1* | 7/2019 | Brown ............ G06F 21/552 |
| 2019/0213247 A1 | 7/2019 | Pala et al. |
| 2019/0244603 A1 | 8/2019 | Angkititrakul et al. |
| 2019/0303703 A1 | 10/2019 | Kumar et al. |
| 2019/0318100 A1 | 10/2019 | Bhatia et al. |

(56) References Cited

U.S. PATENT DOCUMENTS

| | | | |
|---|---|---|---|
| 2019/0334784 A1 | 10/2019 | Kvernvik et al. | |
| 2019/0349400 A1 | 11/2019 | Bruss et al. | |
| 2019/0378051 A1 | 12/2019 | Widmann et al. | |
| 2020/0021607 A1 | 1/2020 | Muddu et al. | |
| 2020/0021620 A1 | 1/2020 | Puratheppparambil et al. | |
| 2020/0082098 A1 | 3/2020 | Gil et al. | |
| 2020/0137104 A1* | 4/2020 | Hassanzadeh | H04L 63/1433 |
| 2020/0177618 A1* | 6/2020 | Hassanzadeh | G06F 21/552 |
| 2020/0228557 A1 | 7/2020 | Lin et al. | |
| 2020/0302118 A1 | 9/2020 | Cheng et al. | |
| 2020/0327886 A1 | 10/2020 | Shalaby et al. | |
| 2021/0089884 A1 | 3/2021 | Macready et al. | |
| 2021/0125050 A1 | 4/2021 | Wang | |
| 2021/0126938 A1* | 4/2021 | Trost | G06F 21/552 |
| 2021/0182612 A1 | 6/2021 | Zeng et al. | |
| 2021/0232768 A1 | 7/2021 | Ling et al. | |
| 2022/0006814 A1 | 1/2022 | Lin et al. | |
| 2022/0147622 A1* | 5/2022 | Chesla | G06F 21/577 |

OTHER PUBLICATIONS

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

DatumBox Blog, "Machine Learning Tutorial: The Naïve Bayes Text Classifier", DatumBox Machine Learning Blog and Software Development News, Jan. 2014, pp. 1-11.

Fargo, Farah "Resilient Cloud Computing and Services", PhD Thesis, Department of Electrical and Computer Engineering, University of Arizona, 2015, pp. 1-115.

Freeman, David, et al., "Who are you? A Statistical Approach to Measuring User Authenticity", NDSS, Feb. 2016, pp. 1-15.

Goh, Jonathan et al., "Anomaly Detection in Cyber Physical Systems using Recurrent Neural Networks", IEEE 2017.

Guo, Diansheng et al., "Detecting Non-personal and Spam Users on Geo-tagged Twitter Network", Transactions in GIS, 2014, pp. 370-384.

Ioannidis, Yannis, "The History of Histograms (abridged)", Proceedings of the 29th VLDB Conference (2003), pp. 1-12.

Kim, Jihyun et al., "Long Short Term Memory Recurrent Neural Network Classifier for Intrusion Detection", IEEE 2016.

Malik, Hassan, et al., "Automatic Training Data Cleaning for Text Classification", 11th IEEE International Conference on Data Mining Workshops, 2011, pp. 442-449.

Mietten, Markus et al., "ConXsense-Automated Context Classification for Context-Aware Access Control", ASIA CCS'14, 2014, pp. 293-304.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Shi, Yue et al., "Cloudlet Mesh for Securing Mobile Clouds from Intrusions and Network Attacks", 2015 3rd IEEE International Conference on Mobile Cloud Computing, Services, and Engineering, pp. 109-118.

Taylor, Adrian et al., "Anomaly Detection in Automobile Control Network Data with Long Short-Term Memory Networks", IEEE 2016.

Taylor, Adrian "Anomaly-Based Detection of Malicious Activity in In-Vehicle Networks", Ph.D. Thesis, University of Ottawa 2017.

Wang, Alex Hai, "Don't Follow Me Spam Detection in Twitter", International Conference on Security and Cryptography, 2010, pp. 1-10.

Wang, Shuhao et al., "Session-Based Fraud Detection in Online E-Commerce Transactions Using Recurrent Neural Networks", 2017.

Zhang, Ke et al., "Automated IT System Failure Prediction: A Deep Learning Approach", IEEE 2016.

* cited by examiner

Example Display of a Threat Scenaio

| tactic | username | src_host | sDate | eDate | rule_id | risk_score | event_id |
|---|---|---|---|---|---|---|---|
| Initial Access | shahar | - | 2019-04-25 16:23:24 | 2019-04-28 09:47:08 | [AL-F-MultiWs, APP-UOb-F, APP-F-FL, APP-UOb-F,... | [13.03, 0.09, 0.18, 0.78, 1.97, 13.03, 0.4, 3.... | [3134140115@m, 3137616850@m, 3149945758@m, 315... |
| Persistence | shahar | - | 2019-04-25 16:23:24 | 2019-04-28 09:47:08 | [AL-F-MultiWs, APP-UOb-F, APP-F-FL, APP-UOb-F,... | [13.03, 0.09, 0.18, 0.78, 1.97, 13.03, 0.4, 3.... | [3134140115@m, 3137616850@m, 3149945758@m, 315... |
| Persistence | shahar | - | 2019-04-29 16:00:06 | 2019-05-01 17:01:16 | [AL-F-MultiWs, AS-UA-F, APP-UAg-F, AL-F-MultiW... | [13.16, 14.45, 0.97, 13.16, 0.37, 1.22, 1.22, ... | [3316950245@m, 3342145800@m, 3343061952@m, 337... |
| Persistence | shahar | 192.168.9.55 | 2019-04-30 18:57:08 | 2019-04-30 18:57:29 | [AE-UA-F, AM-OG-F, AM-GA-AC-F, AM-UA-AC-F, AE-... | [5.95, 19.55, 10.51, 30.0, 5.95] | [3379098141@m, 3379146257@m, 3379146274@m, 337... |
| Privilege Escalation | shahar | 192.168.9.55 | 2019-04-30 18:57:08 | 2019-04-30 18:57:29 | [AE-UA-F, AE-UA-F] | [5.95, 5.95] | [3379098141@m, 3379146274@m] |
| Privilege Escalation | shahar | xps15-111111 | 2019-04-30 22:03:13 | 2019-04-30 22:03:13 | [WPA-USH-F] | [9.92] | [3388539536@m] |
| Privilege Escalation | drew | xps15-111111 | 2019-04-30 22:03:14 | 2019-04-30 22:03:33 | [RA-UH-F, WPA-UH-F, WPA-USH-F] | [5.59, 9.77, 9.7] | [3388544081@m, 3388567933@m, 3388567933@m] |
| Lateral Movement | rqzdbtqnml | xps15-111111 | 2019-04-30 22:03:15 | 2019-04-30 22:22:15 | [NTLM-mismatch, SA-OU-F, SA-AsU-F, SA-AsU-F, R... | [49.25, 9.1, 8.52, 8.52, 15.0, 15.0] | [3388551639@m, 3388552774@m, 3388552774@m, 338... |

FIG. 3

GRAPH-BASED MULTI-STAGED ATTACK DETECTION IN THE CONTEXT OF AN ATTACK FRAMEWORK

RELATED APPLICATIONS

This application claims the benefit of U.S. Provisional Application No. 63/084,899, filed on Sep. 29, 2020, and titled "Graph-Based Multi-Staged Attack Detection," the contents of which are incorporated by reference herein as if fully disclosed herein.

BACKGROUND OF THE INVENTION

1. Field of the Invention

This invention relates generally to cyberattack security and detection in computer networks, and more specifically to graph-based, multi-staged cybersecurity attack detection in the context of an attack framework.

2. Description of the Background Art

Cybersecurity monitoring systems generate alerts for analysts to investigate. For a large organization, a huge volume of alerts are generated on a daily basis, and it is difficult for analysts at such organizations to investigate alerts individually. As a result, presenting alerts in a meaningful and understandable way is critical for the usability of cybersecurity monitoring systems. A common approach to detecting cybersecurity threats and organizing alerts is on a per-user and per-24-hour session approach. There are a number of issues with this approach:

- The 24-hour resolution is arbitrary. A given threat is not necessarily confined within the rigid 24-hour resolution.
- Slow-and-low attack detection is difficult to address. Since sessions are essentially scored independent from one another, malicious activity from one session is not connected with other future or past sessions of the same user or those of other users.
- Most critically, it is challenging for analysts to act on a seemingly random collection of alerts with no immediate story to tell. The burden is on the analysts to evaluate the severity scope of a session.

Therefore, there is strong demand for a solution that automatically and intelligently connects alerts in a way that detects attacks across users and sessions and that presents the connected alerts with an immediate story to tell.

SUMMARY OF THE DISCLOSURE

The present disclosure relates to a system, method, and computer program for graph-based multi-stage attack detection in which alerts are displayed in the context of aa sequence of tactics in an attack framework, such as the MITRE ATT&CK framework. The method enables the detection of cybersecurity threats that span multiple users and sessions and provides for the display of threat information in the context of a framework of attack tactics.

A computer system for detecting cybersecurity attacks obtains a plurality of cybersecurity alerts generated in an analysis window, such as a 30-60 day window. The system classifies each of the alerts with an attack tactic in an attack framework having a sequence of attack tactics.

The system then groups the alerts into tactic blocks, where each tactic block is associated with a start time, an end time, and an attack tactic. The system creates a graph of tactic blocks by directionally connecting blocks based on a time criterion, a tactic criterion, and a matching criterion. Directionally connecting tactic blocks based on the time, tactic, and matching criteria enables multi-stage threat detection.

In certain embodiments, the time criterion for directionally connecting a first tactic block to a second tactic block is satisfied if the first block has an earlier start time than the second block and if the end time of the first block is within P hours of the start time of the second block.

In certain embodiments, the tactic criterion for directionally connecting a first tactic block to a second tactic block is satisfied if the tactic is associated with the first block is the same or proceeds the tactic associated with the second block in the attack framework.

In certain embodiment, the matching criterion for directionally connecting a first tactic block to a second tactic block is satisfied if one or more of the following is true:
(a) the first and second blocks are associated with the same user name;
(b) the first and second blocks share the same source host computer; or
(c) any of the first block destination host computers matches the second block's source host computer.

After creating the graph, the system identifies one or more independent clusters of interconnected components in the graph of tactic blocks. For example, the system may identify connected components in the graph using a connected components algorithm in graph theory. For each of the clusters, the system identifies a threat scenario comprising a sequence of attack tactics in the attack framework. In certain embodiments, identifying a threat scenario includes identifying a path of tactic blocks in the cluster that represents the highest-risk sequence of events in the cluster.

The system ranks the threat scenarios and displays information for the n highest ranked threat scenarios, wherein n is an integer greater than or equal to 1. The information displayed for a threat scenario includes a sequence of attack tactics associated with the threat scenario. In this way, the threat is presented with a "story" of the threat as told by the sequence of attack tactics.

BRIEF DESCRIPTION OF THE FIGURES

FIG. 3 illustrates an example display of a threat scenario.

DETAILED DESCRIPTION OF THE PREFERRED EMBODIMENTS

The present disclosure relates to a system, method, and computer program for graph-based multi-stage attack detection in which alerts are displayed in the context of tactics in an attack framework, such as the MITRE ATT&CK framework. The method is implemented in software and performed by a computer system that detects and assesses cyber threats in a network. The computer system may be a user behavior analytics (UBA) system or a user-and-entity behavior analytics system (UEBA) An example of a UBA/UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

An embodiment of the invention is described below with respect to FIG. 1.

1. Grouping Alerts into Tactic Blocks

The system receives and/or generates security alerts on an on-going basis. The alerts may be in the form of triggered fact or anomaly-based rules or they may be in form of events with non-zero risks in the case of a non-rule-based system that assesses event risks based on probability calculations. The system may generate the alerts itself and/or receive alerts from other cyber-monitoring systems.

The input to the method is a collection of alerts over a time frame, such as a day or several months. The time frame is referred to as the analysis window herein. In one embodiment, the method is performed on a daily basis, such as a batch job at the end of each day, using alert data from the past 30-60 days (i.e., an analysis window of the past 30-60 days). In certain embodiments, the system may filter out certain rules, such as rules that trigger frequently, from the analysis window.

Figure 1:
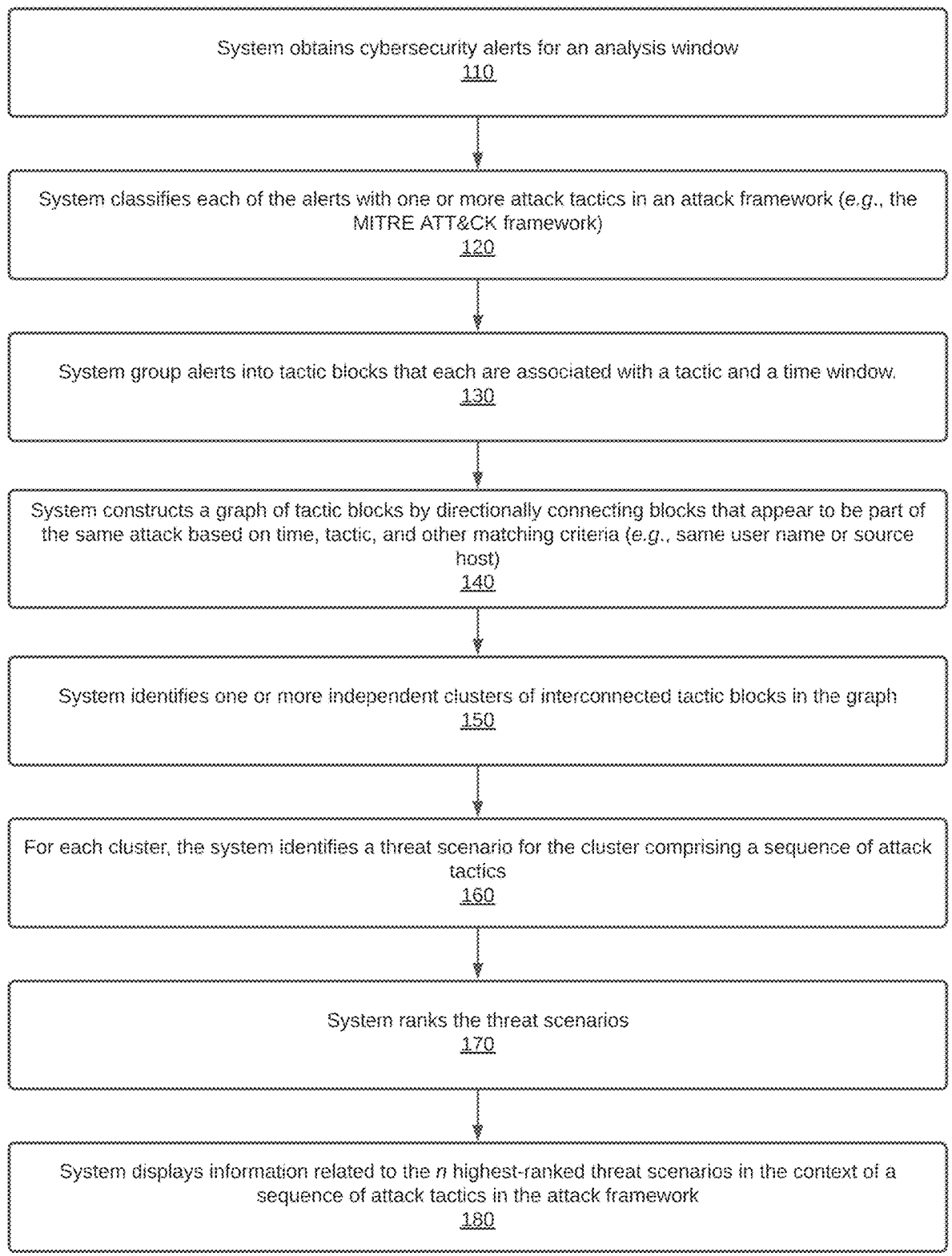
FIG. 1 is a flowchart that illustrates a method, according to one embodiment, for graph-based multi-stage attack detection in which alerts are displayed in the context of tactics in an attack framework.

As shown in FIG. 1, the system obtains the alerts generated or received in an analysis window (step 110). The system classifies each of the alerts with one or more attack tactics in an attack framework (step 120). An attack framework categorizes attack techniques into a number of attack tactics. An example of an attack framework is the MITRE ATT&CK framework which has the following twelve attack tactics: Initial Access, Execution, Persistence, Privilege Escalation, Defense Evasion, Credential Access, Discovery, Lateral Movement, Command and Control, Exfiltration, and Impact. A number of attack techniques are mapped to each of these attack tactics. In one embodiment, each rule or event that can be the basis of an alert is pre-tagged with one or more attack techniques in the attack framework. In step 120, the system classifies an alert with one or more attack tactics by mapping the attack technique(s) associated with the alert to the applicable tactic(s) in the framework.

The system organizes alerts in the analysis window into groups referred to herein as "tactic blocks" (step 130). A tactic block is a group of alerts that satisfy an alert grouping criteria, including having the same tactic and falling within a certain time window. In one embodiment, alerts are grouped into tactic blocks based on tactic, time, user name, and source host. Each tactic block is associated with a start and end time based on the start and end timestamps of the first and last alert in the tactic block. In one embodiment, alerts are first grouped based on tactic, user name, and source host. If there are gaps of more than X amount of time (e.g., X=24 hours) between alerts, then the tactic block is split into smaller blocks.

An alert may appear in more than one tactic block. An alert associated with n tactics will be part of n tactic blocks, where n is an integer greater than or equal to 1. As a result, there may be multiple tactic blocks that are identical except for the tactic associated with the tactic block.

2. Graphing Tactic Blocks

A graph-based approach is used to ascertain "attack stories" from the tactic blocks, where the tactic blocks are the nodes of the graph. The system constructs a graph of tactic blocks by sorting tactic blocks by their start times and directionally connecting blocks that appear to be part of the same attack based on time, tactic, and matching criteria (e.g., same user name or source host) (step 140). The matching criteria may be based on attributes of the tactic blocks that are in addition to time and tactic. For example, if the alerts are grouped into tactic blocks based on time, tactic, user name, and source host, then the tactic blocks may be matched using the user name and source host attributes of the blocks. Directionally connecting tactic blocks based on time, tactic, and matching criteria enables threats to be identified across multiple stages of an attack.

In one embodiment, tactic blocks are sorted by their start times and a tactic block C ("C") is directionally connected to a next tactic block N ("N") in time if the following time, tactic, and matching criteria are met:

Time criteria: C's end time is within P hours from N's start time (e.g., P=24 or 48 hours) and N's end time is after C's start time; AND Tactic criteria: C's tactic is before or the same as N's tactic in the sequence of tactics in the attack framework; AND Matching Criteria: The condition of:
  The nodes share the same username; OR
  The nodes share the same source host computer; OR
  Any of C's destination host computers matches N's source host computer; OR
  Other matching criteria, such as, for example, shared hash, email subject, or filename.

In the example above, the time criteria ensures that connected tactic blocks are sufficiently close in time. The tactic criteria ensures that the story told by connected blocks fits within the attack framework. The matching criteria helps to further ensure that connected tactic blocks are part of the same attack. As indicated above, the MITRE ATT&CK framework consists of twelve tactics that have a sequential order. Although cyber attacks do not necessarily follow the exact sequence of tactics in the MITRE ATT&CK sequence, the tactic sequence generally reflects the most common order in which the tactics appear. The tactic criteria ensures that the story told by connected blocks is consistent with the sequence of tactics in the attack framework.

Figure 2:
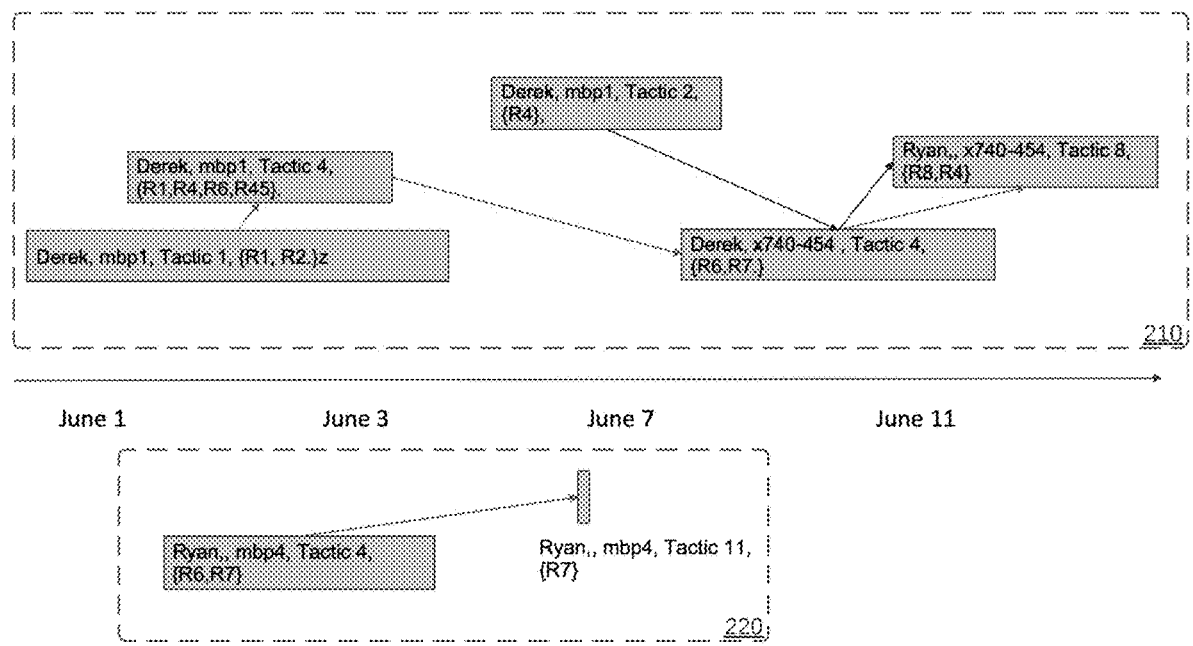
FIG. 2 illustrates an example graph of tactic blocks.

3. Identify Threat Scenarios from Clusters of Interconnected Tactic Blocks in the Graph Once the graph is constructed, the system identifies one or more independent clusters of interconnected tactic blocks in the graph (step 150). Each cluster is a collection of tactic blocks that are directionally connected. There is no overlap between any pair of clusters. Each cluster captures a group of connected tactic blocks, and each cluster stands alone. In one embodiment, identifying clusters comprises identifying connected components in the graph, wherein each connected component is an independent cluster. FIG. 2 illustrates an example of graphed tactic blocks with two connected components, namely connected component 210 and connected component 220. The system may use a known connected components algorithm from the graph theory to identify connected components in the tactic blocks graph. An example of a connected component algorithm is set forth in in the following reference, which is incorporated herein by reference:

Hopcroft, J.; Tarjan, R. (1973), "Algorithm 447: Efficient algorithms for graph manipulation", *Communications of the ACM*, 16(6): 372-378, doi: 10.1145/362248.362272.

For each of the clusters, the system identifies a threat scenario comprising a sequence of attack tactics (step 160). Each cluster has one or more paths of tactic blocks. A path of tactic blocks is a sequence of directionally connected tactic blocks that respects the sequence of tactics in the attack framework. In one embodiment, identifying a threat scenario for a cluster comprises identifying the path within the cluster that represents the highest-risk sequence of events in the cluster. Each cluster is associated with one threat scenario. In one embodiment, the system identifies the path associated with the highest-risk sequence of events in a cluster as follows:

- The system identifies the start nodes in the cluster. The start nodes are the tactic blocks with only outgoing edges and no incoming edges (i.e., they are directionally connected to only other tactic block(s) that have a later start time).
- Each of the start nodes serves as a starting point of a path within the cluster. Starting from a start node, a path follows the edges to nodes (i.e., tactic blocks) in time. When a node encounters a fork, new paths are instantiated, one for each node forked.
- Each alert is associated with a risk score or a risk probability based on the underlying rules or events that caused the alert to trigger. Each path is scored by summing up risk scores or risk probabilities associated with the alerts present in each node in the path. In certain embodiments, paths may be filtered based on thresholding on number of users involved, number of security vendor's alerts involved, time duration, etc.
- The highest-scoring path is selected as the threat scenario for the cluster, as it represents the highest-risk sequence of events in the cluster.

By identifying a sequence of attack tactics as a threat scenario, the system is able to detect threats across multiple stages of attack. The system ranks the threat scenarios based on the score associated with each threat scenario (e.g., the sum of the scores of all triggered rules in the threat scenario path) (step 170).

4. Displaying Threat Scenarios in Context of the Attack Framework

The system displays information related to the highest-ranked threat scenarios, including the sequence of attack tactics associated with the threat scenario (step 180). In one embodiment, the n highest-ranked threat scenarios are displayed, wherein n is a positive integer. The sequence of attack tactics displayed for the threat scenario is based on the sequence of tactic blocks and associated tactics in the threat scenario. FIG. 3 illustrates an example of how information for a threat scenario may be displayed. In this example, the information is displayed in a table, where there is a row corresponding to each tactic block in the path that makes up the threat scenario. The table includes a "tactic" column that enables the user to see the progression of attack tactics for the threat scenario. Thus, the displayed information effectively tells a story about the threat scenario in terms of the attack framework. Each row also includes the user name, start time, end time, source host (if any), rules triggered, and risk scores for the tactic block corresponding to the row.

Figure 4:
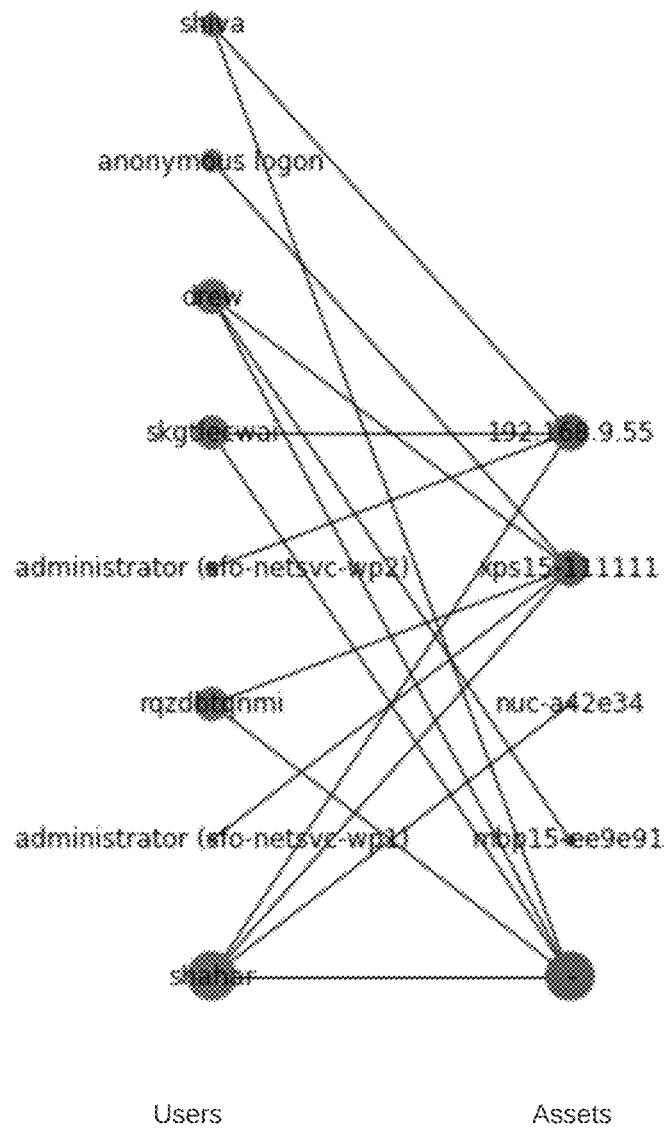
FIG. 4 illustrates an example username-asset graph for a threat scenario.

There are also other ways in which information for a threat scenario may be displayed. For example, the threat scenario may be presented in the form of a graphical timeline illustrating the progression of attack tactics for the threat scenario. It is often useful for a user to seen the usernames and assets (e.g., source hosts) associated with threat scenario. FIG. 4 illustrates an example of a graph that illustrates the user names and assets associated with a threat scenario. The graph in FIG. 4 show that there are eight user names and four assets in the threat scenario.

5. Alternate Embodiment

In an alternate embodiment, the system does not identify the highest-risk path in a cluster. Instead, it sums of the scores of the triggered rules/event in each of the tactic blocks of the cluster if applicable and ranks the clusters accordingly. In this embodiment, each cluster in its entirety is considered the threat scenario (as opposed to the highest-risk path in the cluster). In the display step, the system may show a visual timeline of all paths in the threat scenario, including showing how paths merge and bifurate from beginning to end.

6. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for graph-based, multi-stage attack detection in which cybersecurity alerts are displayed based on attack tactics in an attack framework, the method comprising:
    obtaining a plurality of cybersecurity alerts ("alerts") generated in an analysis window;
    classifying each of the alerts with an attack tactic based on the attack framework having a sequence of attack tactics;
    grouping the alerts into tactic blocks, wherein each tactic block satisfies an alert grouping criteria including having a same attack tactic and falling within a time window, wherein the time window is within the analysis window, and wherein each tactic block is associated with a start time based on a start timestamp of a first alert in the tactic block and an end time based on an end timestamp of a last alert in the tactic block;
    constructing a graph of tactic blocks by directionally connecting blocks based on a time criteria, a tactic criteria, and a matching criteria, wherein the time criteria for directionally connecting a first tactic block to a second tactic block is satisfied in response to the first tactic block having an earlier start time than a second tactic block and in response to the end time of the first tactic block being within P hours of the start time of the second tactic block, and wherein the tactic criteria is satisfied for directionally connecting the first tactic block to the second tactic block in response to the tactic associated with the first tactic block being the same or preceding the tactic associated with the second tactic block in the attack framework;
    identifying one or more clusters of interconnected components in the graph of tactic blocks;

for each of the clusters, identifying a threat scenario comprising a sequence of attack tactics in the attack framework;
ranking the threat scenarios; and
displaying information for n highest ranked threat scenarios, wherein n is a positive integer, and wherein the information displayed for said threat scenarios includes a sequence of attack tactics associated with the threat scenario.

2. The method of claim 1, wherein the matching criteria for directionally connecting the first tactic block to the second tactic block is satisfied in response to the first and second tactic blocks satisfying one or more of the following:
   (a) the first and second tactic blocks are associated with the same user name;
   (b) the first and second tactic blocks share the same source host computer; or
   (c) any of the first tactic block destination host computers matches the second tactic block's source host computer.

3. The method of claim 1, wherein identifying the one or more clusters comprises identifying one or more connected components using a connected component algorithm in graph theory.

4. The method of claim 1, wherein, for each of the clusters, identifying the threat scenario comprises identifying a path that represents the highest-risk sequence of events in the cluster.

5. The method of claim 4, wherein, each alert is associated with a risk score, and the path representing the highest-risk sequence of events is identified based on risk scores associated each type of alert in the path.

6. The method of claim 5, wherein the threat scenarios are ranked as a function of the risk scores associated with the threat scenarios.

7. The method of claim 1, wherein the sequence of attack tactics displayed is based on the sequence of tactic blocks in the threat scenario.

8. A non-transitory computer-readable medium comprising a computer program, that, when executed by a computer system, enables the computer system to perform the following method for graph-based, multi-stage attack detection in which cybersecurity alerts are displayed based on attack tactics in an attack framework, the method comprising:
   obtaining a plurality of cybersecurity alerts ("alerts") generated in an analysis window;
   classifying each of the alerts with an attack tactic based on the attack framework having a sequence of attack tactics;
   grouping the alerts into tactic blocks, wherein each tactic block satisfies an alert grouping criteria including having a same attack tactic and falling within a time window, wherein the time window is within the analysis window, and wherein each tactic block is associated with a start time based on a start timestamp of a first alert in the tactic block and an end time based on an end timestamp of a last alert in the tactic block;
   constructing a graph of tactic blocks by directionally connecting blocks based on a time criteria, a tactic criteria, and a matching criteria, wherein the time criteria for directionally connecting a first tactic block to a second tactic block is satisfied in response to the first tactic block having an earlier start time than a second tactic block and in response to the end time of the first tactic block being within P hours of the start time of the second tactic block, and wherein the tactic criteria is satisfied for directionally connecting the first tactic block to the second tactic block in response to the tactic associated with the first tactic block being the same or preceding the tactic associated with the second tactic block in the attack framework;
   identifying one or more clusters of interconnected components in the graph of tactic blocks;
   for each of the clusters, identifying a threat scenario comprising a sequence of attack tactics in the attack framework;
   ranking the threat scenarios; and
   displaying information for n highest ranked threat scenarios, wherein n is a positive integer, wherein the information displayed for said threat scenarios includes a sequence of attack tactics associated with the threat scenario.

9. The non-transitory computer-readable medium of claim 8, wherein the matching criteria for directionally connecting the first tactic block to the second tactic block is satisfied in response to the first and second tactic blocks satisfying one or more of the following:
   (a) the first and second tactic blocks are associated with the same user name;
   (b) the first and second tactic blocks share the same source host computer; or
   (c) any of the first tactic block destination host computers matches the second tactic block's source host computer.

10. The non-transitory computer-readable medium of claim 8, wherein identifying the one or more clusters comprises identifying one or more connected components using a connected component algorithm in graph theory.

11. The non-transitory computer-readable medium of claim 8, wherein, for each of the clusters, identifying the threat scenario comprises identifying a path that represents the highest-risk sequence of events in the cluster.

12. The non-transitory computer-readable medium of claim 11, wherein, each alert is associated with a risk score, and the path representing the highest-risk sequence of events is identified based on risk scores associated each type of alert in the path.

13. The non-transitory computer-readable medium of claim 12, wherein the threat scenarios are ranked as a function of the risk scores associated with the threat scenarios.

14. The non-transitory computer-readable medium of claim 8, wherein the sequence of attack tactics displayed is based on the sequence of tactic blocks in the threat scenario.

15. A computer system for graph-based, multi-stage attack detection in which cybersecurity alerts are displayed based on attack tactics in an attack framework, the system comprising:
   one or more processors;
   one or more memory units coupled to the one or more processors, wherein the one or more memory units store instructions that, when executed by the one or more processors, cause the system to perform the operations of:
      obtaining a plurality of cybersecurity alerts ("alerts") generated in an analysis window;
      classifying each of the alerts with an attack tactic based on the attack framework having a sequence of attack tactics;
      grouping the alerts into tactic blocks, wherein each tactic block satisfies an alert grouping criteria including having a same attack tactic and falling within a time window, wherein the time window is within the analysis window, and wherein each tactic block is associated with a start time based on a start timestamp of a first alert in the tactic block and an end time based on an end timestamp of a last alert in the tactic block;

constructing a graph of tactic blocks by directionally connecting blocks based on a time criteria, a tactic criteria, and a matching criteria, wherein the time criteria for directionally connecting a first tactic block to a second tactic block is satisfied in response to the first tactic block having an earlier start time than a second tactic block and in response to the end time of the first tactic block being within P hours of the start time of the second tactic block, and wherein the tactic criteria is satisfied for directionally connecting the first tactic block to the second tactic block in response to the tactic associated with the first tactic block being the same or preceding the tactic associated with the second tactic block in the attack framework;

identifying one or more clusters of interconnected components in the graph of tactic blocks;

for each of the clusters, identifying a threat scenario comprising a sequence of attack tactics in the attack framework;

ranking the threat scenarios; and displaying information for n highest ranked threat scenarios, wherein n is a positive integer, wherein the information displayed for said threat scenarios includes a sequence of attack tactics associated with the threat scenario.

16. The system of claim 15, wherein, for each of the clusters, identifying the threat scenario comprises identifying a path that represents the highest-risk sequence of events in the cluster.

* * * * *